United States Patent [19]

Dimpault-Darcy et al.

[11] Patent Number: 4,973,936
[45] Date of Patent: Nov. 27, 1990

[54] THERMAL SWITCH DISC FOR SHORT CIRCUIT PROTECTION OF BATTERIES

[75] Inventors: Eric C. Dimpault-Darcy, Seabrook; Bobby J. Bragg, Dickinson, both of Tex.

[73] Assignee: The United States of America as represented by the Administrator of the National Aeronautics and Space Adminstration, Washington, D.C.

[21] Appl. No.: 343,652

[22] Filed: Apr. 27, 1989

[51] Int. Cl.$^5$ ............................................. H01L 43/00
[52] U.S. Cl. .................................. 338/32 R; 320/51; 338/221
[58] Field of Search ..................... 338/22 R, 221, 220, 338/8; 320/49, 51

[56] References Cited

U.S. PATENT DOCUMENTS

| | | | |
|---|---|---|---|
| 3,467,937 | 9/1969 | Norton | 338/219 |
| 4,255,698 | 3/1981 | Simon | 338/22 R X |
| 4,327,282 | 4/1982 | Nauerth | 219/541 |
| 4,426,573 | 1/1984 | Fudickar et al. | 219/544 |
| 4,635,026 | 1/1987 | Takeuchi | 338/22 |

Primary Examiner—Bruce A. Reynolds
Assistant Examiner—Marvin Lateef
Attorney, Agent, or Firm—Edward K. Fein; John R. Manning; Russell E. Schlorff

[57] ABSTRACT

A protective device for one battery or serially arranged battery cells is adapted to fit between one battery and its terminal connector or between adjacent battery cells. The device incorporates a disk of positive temperature coefficient material having a pair of circular end faces for contact. The disk is supported by a ring adhesively joined thereto, the ring having a central axial opening to enable the button terminal of a battery cell to contact against the disk as the disk and battery cell are arranged in a single battery application or in serial contact with similar battery cells.

4 Claims, 1 Drawing Sheet

U.S. Patent     Nov. 27, 1990     4,973,936
FIG. 1
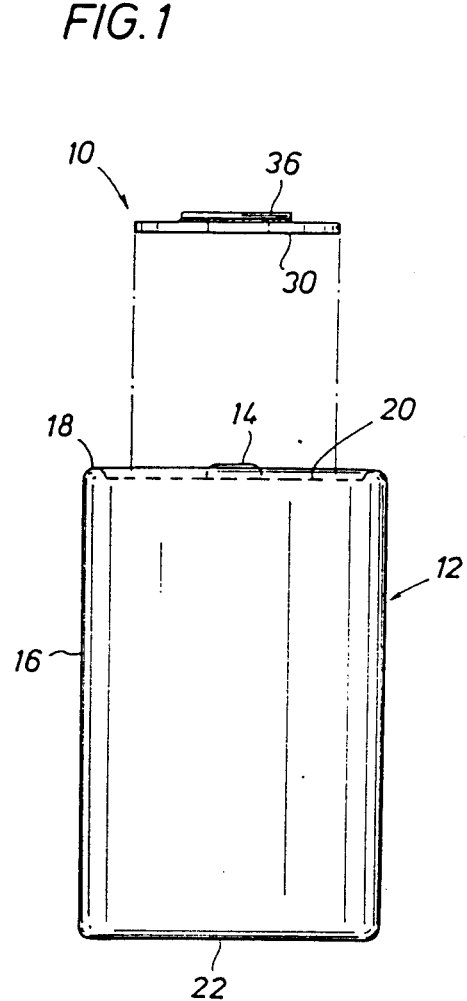
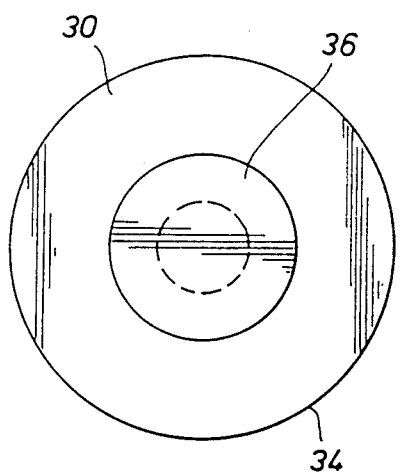
FIG. 2
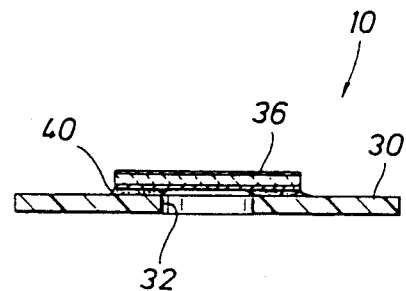
FIG. 3

4,973,936

THERMAL SWITCH DISC FOR SHORT CIRCUIT PROTECTION OF BATTERIES

ORIGIN OF THE INVENTION

The invention described herein was made by employees of the United States Government and may be manufactured and used by for the government of the United States of America for governmental purposes without the payment of any royalties thereon or therefor.

TECHNICAL FIELD

The present invention relates to a type of series installed over current protector which is also sensitive to excessive temperature. It is therefore able to provide protection in the event of excessive current and excessive operating temperature. It is particularly useful with a stack of batteries arranged in series. In particular, it is used with batteries which have a circular cell construction having an upper positive terminal. The positive terminal is normally formed as a central button which protrudes above the cell. The present apparatus thus mounts on the central button, thereby enabling several batteries to be arranged in a stack. In that circumstance, protection is provided so that operation at excessive temperatures is safely interrupted. Also, continued battery power is interrupted in the event of a short circuit. This device is especially useful as a safety device to prevent temperature or current overload situations particularly with a stack of batteries. It finds a special application as a safety device for preventing formation of sparks from battery powered systems. In fact, the present apparatus is intended for use with one or more cylindrical battery cells abutted in series arrangement with positive and negative terminals connecting; such a system in protected by the installation of the present protective device between adjacent batteries so that the safety device clamped between the batteries has a physically fixed location, and thus assures protection of all of the circuitry which includes the batteries as a current source.

There are two particularly important goals involved in protection. The first factor is protection against excessive current flow, the size of current that might flow on an accidental short between the power supply and ground. In addition to that, there is the risk of excessive temperatures. Excessive current and temperature are factors that may be interrelated in certain circumstances. As the temperature increases, the current level which is then defined as excessive is decreased. The present apparatus includes such a characteristic. The present apparatus is in general terms a positive temperature coefficient resistor; yet, it is far more than that. It is a solid state disk of conductive material which has a normal low resistance changing to a maximum resistance when installed in the circuit. However, it further includes a supporting peripheral shoulder which locks the conductive element in place so that it is held serially between adjacent batteries in a holder to assure that positive temperature coefficient (PTC hereafter) benefits by providing the proper circuit interruption thereby switching off the equipment and providing an effective interruption of excessive current flow. In a real sense, this is more desirable than a removable fuse because fuses can be incorrectly replaced. The present apparatus is solid state and is therefore devoid of movable parts or components; rather, it is an integral structure which is simply installed in a locked relationship between adjacent battery cells.

The present apparatus takes advantage of current flow to create heat within the device. As heat accumulates, the conductive resistance of the device increases. There is a normal quiescent state wherein the conductive resistance is extremely small. However, with the increase in temperature, the resistance increases slightly. At a certain temperature, there is also a conductive state which is characterized by an extremely high resistance which effectively interrupts current flow. The device tends to run away in the switched state so that current flow through the device is substantially nil. This permits the device to cool, the cooling interval enabling the apparatus to return the solid state conductive material to the low resistance state where regular circuit operation can resume after the interruption. The cooling down interval typically affords sufficient time that the fault creating the excessive current flow can be located and corrected. Moreover, this kind of switching is achieved with a device having no moving parts and is accomplished primarily by a change resulting from the PTC. The circuit protection is accomplished without intruding into the circuit to install some type of relay or other mechanical switching device. This apparatus provides a switching function without the mechanical interplay associated with relay terminals, mercury wetted relay contacts and the like.

The present apparatus is therefore an improved device installed in a stack of one or more similar battery cells to assure protection, especially against excessive currents, high temperatures or combinations of both.

BACKGROUND ART

References which might be material to the present disclosure include U.S. Pat. No. 4,635,026 which discloses a PTC device in a relatively complex enclosure or housing which completely surrounds the apparatus according to FIG. 4 of the drawings. Various stages of fabrication of the PTC apparatus in conjunction with appropriate electrode system is set forth.

U.S. Pat. No. 3,467,937 discloses a thermistor disk which is held within a rimmed elastic housing of silicon rubber having an outer lip which is flexible. The housing wraps around the disk on the opposite major surfaces, and includes an edge located flange or lip for use in an interference fit in a socket.

U.S. Pat. No. 4,327,282 is directed to a heating strip which is made of a PTC material, one or more units thereof, assembled in a sandwich which is disclosed in FIG. 2 wherein the sandwich is clamped in a U-shaped border or rail along the edges thereof.

U.S. Pat. No. 4,426,573 shows another heating element which is defined by a sandwich of layers enclosing a disk made of PTC material, all enclosed with a tight hermetic skin.

Another reference is a brochure published by Raychem Corporation which describes a polySwitch circuit component which is a PTC disk. Mention is made thereat of use in toys and other devices which are battery powered with the polySwitch devices incorporated.

BRIEF DESCRIPTION OF THE PRESENT INVENTION

The present invention is directed to a PTC material having the form a circular disk typically provided with parallel spaced planar circular surfaces. The surfaces are preferably made of a metal film. The circular disk is joined by a suitable adhesive to a surrounding larger disk having a central hole. The hole is sized to receive the central terminal button of cylindrical batteries. The disk and the annular ring provide a stacked structure which fits snugly over the central terminal to provide good electrical connection to direct all current flow through the PTC disk so that over temperature, over current protection is obtained. The PTC disk with the adhesively joined insulative ring can be readily positioned between either end of one battery and its holder, or a pair of serially arranged batteries to provide such protection.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 1 of the drawings shows the battery over current protective device of the present disclosure installed on a battery having a central upstanding button that one or more such batteries can be assembled serially with protection provided by the apparatus of the present disclosure;

FIG. 2 of the drawings is a plan view of the over temperature, over current protective device of the present disclosure; and FIG. 3 is a side view of the apparatus in FIG. 2.

DETAILED DESCRIPTION OF THE PREFERRED EMBODIMENT

Attention is directed first to FIG. 1 of the drawings where the numeral 10 identifies a protective device in accordance with the teachings of this disclosure. This protective device is installed immediately adjacent to a conventional battery 12 for providing protection for a serial stack of similar batteries. The description of the present apparatus is perhaps best understood by first defining the context in which the disclosed apparatus is utilized.

The battery 12 is the conventional cylindrical battery construction terminating with a central button 14 serving as a current terminal, the button being located at the center of the cylindrical battery 12. The outer jacket is typically formed of a metal sleeve 16 which terminates at a rolled upper lip 18 which overhangs a top face 20. The face 20 is normally formed of nonconductive material. Current from the battery flows through the button or terminal 14. That is normally the positive terminal. The opposite end of the battery supports the opposite polarity terminal 22.

In serial arrangement, the battery 12 is stacked so that the button 14 touches the opposite terminal 22 of an adjacent duplicate battery They can be arranged in any number. It is not uncommon to arrange battery stacks of ten or more cells.

In the use of a battery powered circuit, particularly in atmosphere where the possibility of explosion might arise, the formation of an open circuit is no real risk. However, a short circuit in the battery system creates a greater risk. Moreover, batteries are sensitive to temperature, and a rising temperature for the surrounding environment creates the risk of damage to the battery power supply, perhaps to the system operated thereby and other equipment as well as risk of injury to personnel. In light of the risks and circumstances which arise, it is desirable to provide some measure of safety to the operation of a single battery or stack of battery cells so that danger can be reduced, and injury avoided. The protective device 10 of this disclosure is located at the positive or negative end of one battery or between two adjacent batteries, therebeing at least one of such devices 10 arranged in a stack of batteries. It is not necessary to place the protective device 10 between every adjacent pair of batteries; rather, it is desirable to place this device in series with the batteries to control the series current flow. Accordingly, the protective device 10 can be installed between two adjacent batteries in a stack of batteries of two or more cells. The cells are typically as small as AA cells but can be as large as the typical D cell.

The terminal 14 has an industry specified height and diameter. It fits snugly within a protective ring 30 which has a central opening at 32. The opening 32 is sized to fit around the terminal 14. The ring 30 is formed of an insulating material such as printed circuit board material or the like. It is cut in a circle and has an outer peripheral edge 34 as shown in FIG. 2 of the drawings. It is sized so that it fits within the lip or rim 18 shown in FIG. 1. Moreover, the relative thickness of the ring 30 is such that contact is assured by the terminal 14 with the PTC disk 36. The disk 36 is a circular disk formed of a material which is a positive temperature coefficient material. Various types can be used, but one quite acceptable material is provided by Raychem, a supplier of products sometimes sold under the trademark polySwitch. The disk 36 therefore is constructed with upper and lower surfaces which are typically metal clad, the opposing faces both being metal to thereby enable good conductive connection in operation. The material between the opposing metal faces has a characteristic such that resistance across the two circular faces of the disk is negligible at ambient temperature. Indeed, the resistance can be only a fraction of an ohm in a typical installation. This resistance however is temperature sensitive. The resistance is thus extremely low at a specified temperature, or at ambient conditions prevailing during ordinary operation. As the upper end of the operating conditions is approached, the resistance of the device increases. It is not uncommon for the resistance to increase by at least three orders of magnitude, perhaps even as much as six orders of magnitude. This rises in temperature builds up within the device. If the device is being used in a situation where the current is excessive, or the prevailing ambient temperature is near the upper end of that permitted, the temperature of the disk builds up so that the series resistance is markedly increased, substantially to a state where all current is blocked. In actuality, current is not blocked in the manner that an open circuit would block such current flows; rather, the serial resistance is so high that the current permitted is extremely small, typically in the range of a few microamperes. That current will provide some measure of heat in the disk which tends to sustain the high resistance state. However, the small current will ultimately permit cooling of the disk at which time switching occurs back to the low resistance state. As will be understood, the performance of the device is extremely nonlinear; that is, when switching occurs whereby series resistance markedly increases, it provides a switching function which is almost instantaneous. Moreover, at the time of cooling the device will return to its low resistance state.

The disk 36 is joined to the ring 30 by means of a suitable adhesive 40 which is placed between the two. The cured adhesive 40 secures the two devices in the close relationship as shown in the drawings, and thereby assures a rugged device so that physical abuse poses no problem to the protection offered by the structure. Moreover, the arrangement of the ring 30 adjacent to the disk 36 assures that a proper serial connection can be obtained when installed between adjacent cells as exemplified in FIG. 1 of the drawings.

The dimensions of the ring 30 and the disk 36 can be tailored to accommodate the relative size of the battery terminal 14 and the diameter of the battery cell 12. Once installed, the device can be substantially forgotten until the batteries are depleted. After the batteries are depleted, even when new batteries are installed, the protective device 10 can again be installed to protect the replacement battery stack.

While the foregoing is directed to the preferred embodiment, the scope thereof is determined by the claims which follow:

We claim:

1. A protective insert for use with one battery or with one or more battery cells connected in serial connection wherein one of the cells has a central current providing terminal shaped as a button, and the insert comprises a circular disk of specified diameter having parallel opposing faces and wherein the circular disk is formed of positive temperature coefficient resistive material increasing to a high resistance at a specified operating temperature, and also includes a joined circular spacer ring having a central aperture wherein the aperture is sized to received the battery terminal therein for contact with said disk, and said ring is formed of electrical insulation material, and wherein said disk and ring are joined by an adhesive material therebetween.

2. The apparatus of claim 1 wherein said disk has exposed upper and lower circular surfaces and said lower surface is positioned within said aperture in said ring, and wherein said ring has a diameter permitting said ring to fit around a typical positive terminal and within a battery case bead surrounding said terminal.

3. The apparatus of claim 2 wherein said ring includes an axially located aperture concentric within a circular surrounding outer periphery.

4. The apparatus of claim 3 wherein said circular disk includes metal clad upper and lower faces.

* * * * *